J. H. SISSEL.
TRACTOR.
APPLICATION FILED MAY 13, 1919.
1,346,771.
Patented July 13, 1920.
4 SHEETS—SHEET 2.
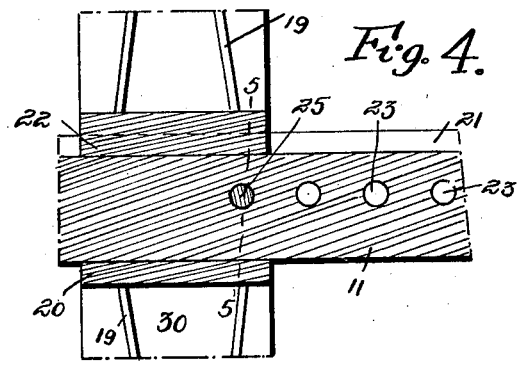
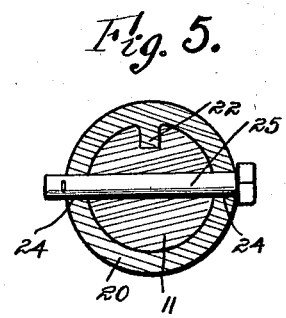
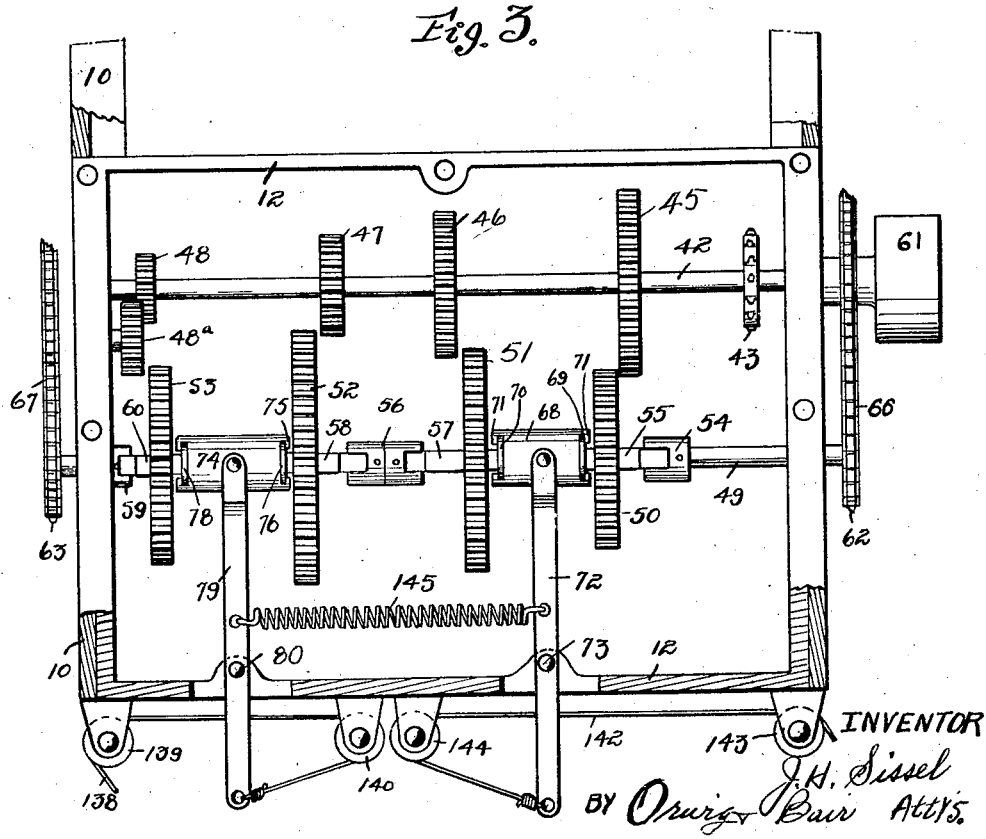

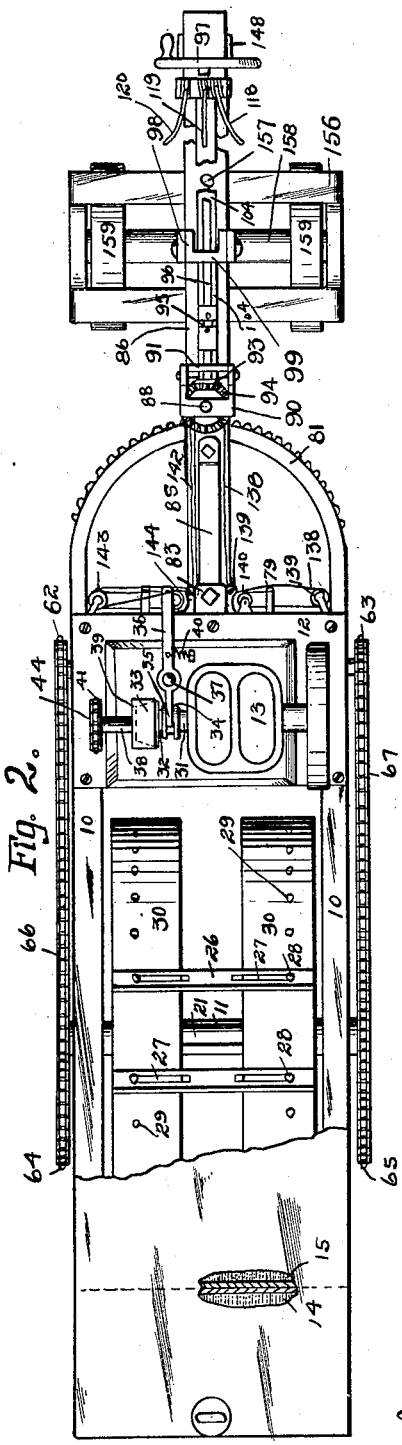
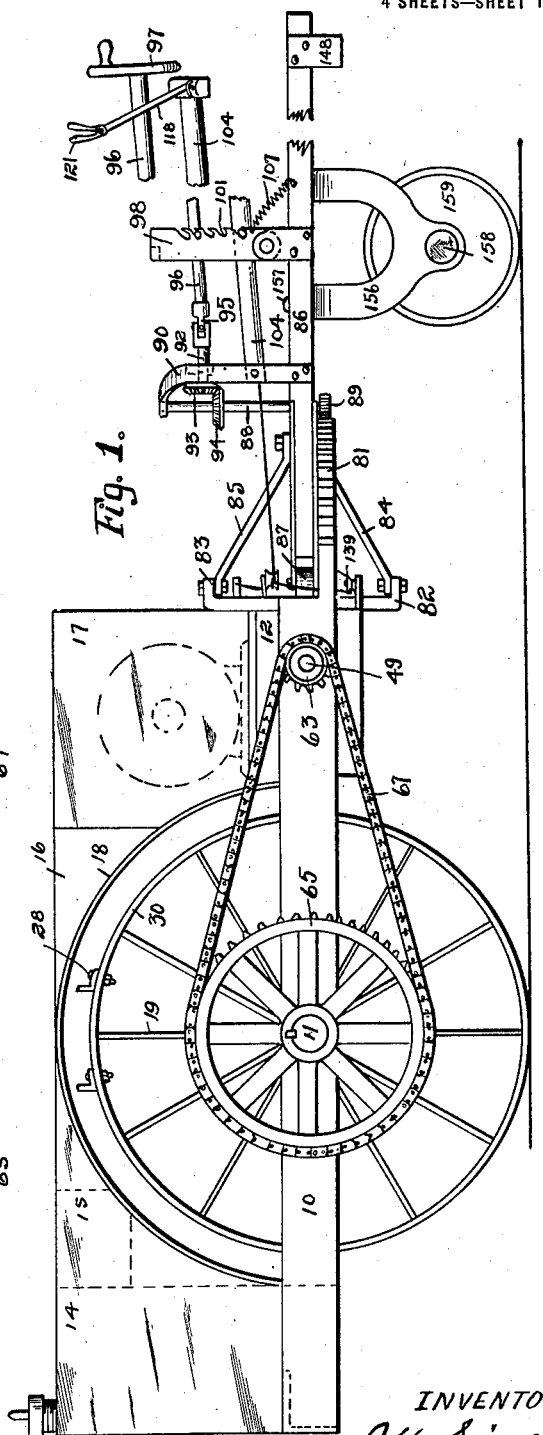

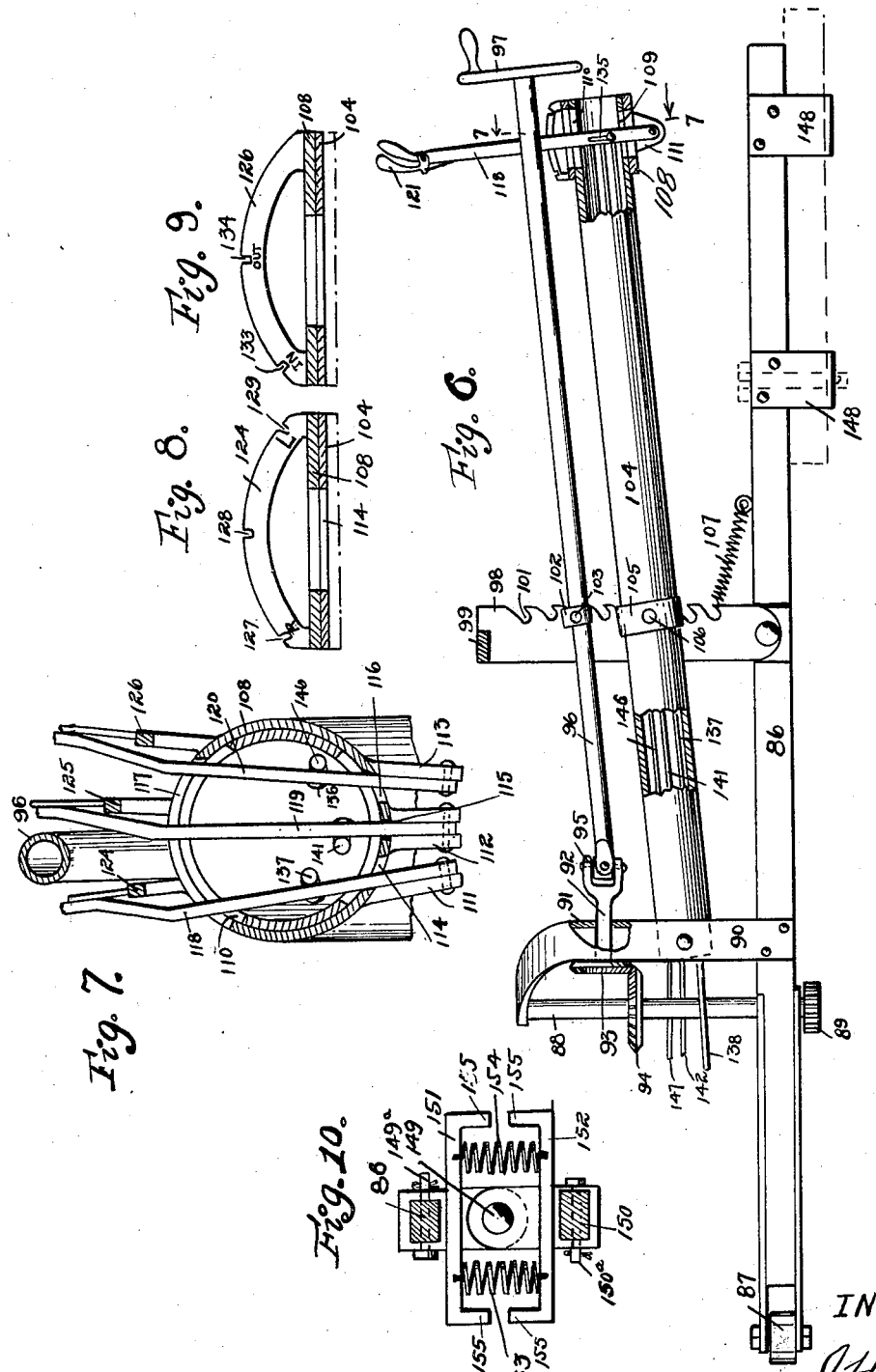

J. H. SISSEL.
TRACTOR.
APPLICATION FILED MAY 13, 1919.
1,346,771.
Patented July 13, 1920.
4 SHEETS—SHEET 4.
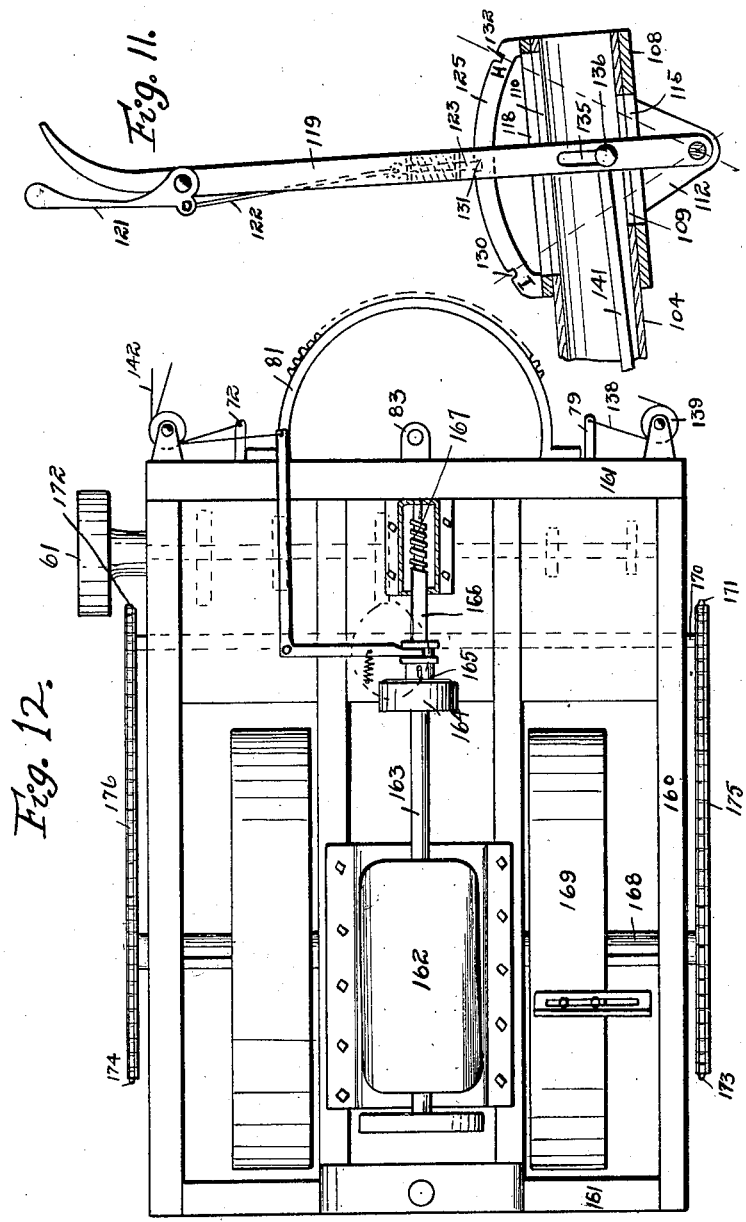
INVENTOR
J. H. Sissel.
BY Orwig & Bair Attys.

UNITED STATES PATENT OFFICE.

JOHN H. SISSEL, OF LAMONT, IOWA.

TRACTOR.

1,346,771.　　　　　Specification of Letters Patent.　　Patented July 13, 1920.

Application filed May 13, 1919. Serial No. 296,838.

*To all whom it may concern:*

Be it known that I, JOHN H. SISSEL, a citizen of the United States, and a resident of Lamont, in the county of Buchanan and State of Iowa, have invented a certain new and useful Tractor, of which the following is a specification.

The object of my invention is to provide a tractor of the general type having one supporting wheel or wheels and adapted to be used in connection with other machinery or vehicles which support one end of the tractor.

A further object is to provide such a tractor provided with suitable controlling and steering mechanism capable of being controlled from the seat of the vehicle or machine which is drawn by the tractor.

A further object is to provide in such a tractor supporting wheels capable of lateral adjustment in the machine, and having non-skid lugs which connect the supporting wheels.

With these and other objects in view my invention consists in the construction, arrangement and combination of the various parts of the device whereby the objects contemplated are attained, as hereinafter more fully set forth, pointed out in my claims and illustrated in the accompanying drawings, in which:

Figure 1 shows a side elevation of a tractor embodying my invention, having the removable truck for supporting one end of the tractor when it is not in actual use with other machinery.

Fig. 2 shows a top or plan view of the same, parts being broken away.

Fig. 3 shows a top or plan view of the variable speed gearing mechanism.

Fig. 4 shows a detail, sectional view of the axle and one of the wheels thereon.

Fig. 5 shows a detail, sectional view taken on the line 5—5 of Fig. 4.

Fig. 6 shows a side elevation partly in section of the steering and controlling mechanism.

Fig. 7 shows a detail, sectional view taken on the line 7—7 of Fig. 6.

Figs. 8 and 9 show detail, sectional views of the sectors used in connection with the controlling levers.

Fig. 10 shows a detail view of the tongue hitch.

Fig. 11 shows an enlarged, detail, sectional view of one of the controlling levers; and Fig. 12 shows a top or plan view of the modified form of my tractor.

In the accompanying drawings I have used the reference numeral 10 to indicate generally the laterally spaced longitudinal frame members of my tractor.

Supported by the frame members 10 is an axle 11. Supported at the rearward end of the frame and connecting the members 10 is a gear casing 12, resting on which is a prime mover such as the gasolene engine 13. Located at the front of the machine to partially counter-balance the weight of the engine and gears is a water tank 14, just rearwardly of which and forwardly of the axle is the fuel tank 15.

Over the top central portion of the machine is a casing or cover member 16, and a cover member 17 is provided for the engine. Suitable fenders 18 are provided for the tractor wheel or wheels.

In the form of the invention shown in Fig. 2 I have fixed on the axle 11 between the frame members 10, a double wheel comprising the wheels 19. Each wheel member 19 has a hub 20. The axle 11 is provided with a longitudinal slot 21 which receives a tongue or the like 22 formed on the hub 20, whereby each wheel member is slidably but non-rotatably mounted on the axle. The axle is provided with a series of openings 23, and each hub 20 is provided with spaced alined openings 24. The wheel members 19 are thus capable of lateral adjustment, in the machine on the axle 11, and may be locked in any of their adjusted positions by means of bolts 25 extended through the openings 24 and selectively received in the openings 23.

For connecting the wheel members 19 together and thus forming one supporting wheel, I have provided a series of angle iron lugs or bars 26, each having a pair of elongated openings 27. Bolts 28 are extended through the openings 27 and through openings 29 in the rims 30 of the wheel members 19 for securing the wheel members 19 in any of their laterally adjusted positions with relation to each other and to the body of the machine.

The engine 13 has a shaft 31 on which is slidably but non-rotatably mounted a sleeve 32, formed on one end of which is a cone clutch member 33 shown by dotted lines in Fig. 2. The sleeve 32 has a pair of parallel annular ribs 34. Received in the groove between the ribs 34 are the arms 35 of a bifurcated lever 36. The lever 36 is pivotally supported at 37.

Suitably supported is a short shaft 38 having on one end a coacting clutch member 39. A spring 40 connected with the lever 36 yieldingly tends to hold the clutch members 33 and 39 in engagement.

On the shaft 38 is a sprocket wheel 41.

In the gear casing 12, below the shafts 31 and 38, is a shaft 42. On the shaft 42 in line with the sprocket 41 is a sprocket 43. A chain 44 travels on the sprockets 41 and 43 for imparting rotation from the shaft 38 to the shaft 42. On the shaft 42 is a series of gears 45, 46, 47, and 48 which are gradually reduced in size from the gear 45 to the gear 48. In mesh with the gear 48 is an idler gear 48ª.

Suitably mounted in the gear casing 12 is a countershaft 49 on which are slidably mounted gears 50, 51, 52 and 53.

Fixed on the shaft 49 is a clutch member 54 designed to coact with the clutch member 55 on the gear 50.

Fixed on the shaft 49 is a double clutch member 56 designed to coact with clutch members 57 and 58 on the gears 51 and 52 respectively.

Fixed on the shaft 49 is another clutch member 59 designed to coact with the clutch member 60 on the gear 53.

On the shaft 42 is a belt pulley 61 from which other machinery may be run.

On the shaft 49 are sprockets 62 and 63 in line with sprockets 64 and 65 on the axle 11. Chains 66 and 67 travel on the sprockets 62 and 64 and the sprockets 63 and 65 respectively. On the shaft 49 and slidably mounted between the gears 50 and 51 is a controlling sleeve 68. On the gears 50 and 51 are formed disks 69 and 70 received in suitable journals 71 on the sleeve 68.

Pivotally connected with the sleeve 68 is a lever 72 which is pivoted between its ends at 73 on the gear casing 12 and projects through the wall of the gear casing, as illustrated in Fig. 3.

Mounted on the shaft 49 between the gears 52 and 53 is a similar controlling sleeve 74 slidably mounted and provided with journals 75 to receive disks 76 and 78 on the gears 52 and 53. Pivoted to the sleeve 74 is a lever 79 which projects through the wall of the gear casing 12 and is pivoted at 80 to said gear casing.

Mounted at the rearward end of the frame is a curved rack bar 81.

At the rearward end of the frame are vertically spaced brackets 82 and 83. Pivoted to the brackets 82 and 83 are brace members 84 and 85 extending, respectively, upwardly and rearwardly, and downwardly and rearwardly, and secured at their rearward ends to a tongue 86. The front end of the tongue 86 extends adjacent to the frame and has an anti-friction roller 87. Mounted in the tongue 86 adjacent to the rack 81 is an upright shaft 88 on the lower end of which is a gear 89 which meshes with the teeth of the rack 81.

Supported on the tongue 86 near the shaft 88 is a frame 90, the upper end of which forms a bearing for the upper end of the shaft 88.

The frame 90 has a member 91 which forms a bearing for a short shaft 92.

On the shaft 92 is a beveled gear 93 which meshes with a beveled gear 94 on the shaft 88.

Connected with the shaft 92 by a universal joint 95 is a rearwardly extending steering rod 96.

On the rear end of the steering rod 96 is a steering wheel 97. Supported on the tongue 86 is a pair of laterally, spaced, upwardly extending arms 98 connected at their upper ends on a cross member 99, and having in their rear edges a series of notches 101. The members 98 are pivoted at their lower ends on the tongue 86.

Mounted on the steering rod 96 is a collar 102 from which extend opposite pins 103 which are selectively received in the notches 101 for supporting the steering rod 96.

Pivotally supported on the frame 90 is a tube 104 extending rearwardly in the machine.

Mounted on the tube 104 is a collar 105 having pins 106 designed to be selectively received in the notches 101.

A spring 107 secured to the tongue 86 and to one of the frame members 98, yieldingly holds the frame members 98 in engagement with the pins 106 and 103.

Mounted on the rear end of the tubular member 104 is a sleeve 108. In the tubular member 104 in the upper and lower walls thereof are openings 109 and 110, as illustrated in Figs. 6 and 7. On the lower part of the sleeve 108 are brackets 111, 112 and 113. In the sleeve 108 in the lower part thereof adjacent to the brackets just mentioned are slots 114, 115, and 116. Pivoted to the brackets 111, 112, and 113, respectively, and extending upwardly through the slots 114, 115, and 116, and through the openings 109, and 110 and through an opening 117 in the upper part of the sleeve 108 are levers 118, 119, and 120. Each of these levers has a pivoted handle 121, with a link 122 pivoted thereto. Pivoted to each link is an ordinary spring controlled locking pawl 123. Supported on the sleeve 108 adjacent to the respective levers 118, 119, and 120 are sectors 124, 125, and 126.

The lever 118 is the lever for controlling and shifting the gears for throwing the gears into intermediate and high, and the lever 119 is the lever for throwing the gears into low and reverse.

The sector 124 has three notches 127, 128 and 129, shown in Fig. 8, for receiving the pawl of the lever 118, when the gears operatively controlled by said lever are in reverse and low respectively. The sector 125 has three notches 130, 131, and 132 to receive the pawl of the lever 119 when the gears controlled by said lever are in intermediate, neutral and high, respectively. The lever 120 is the clutch member and the sector 126 has two notches 133 and 134 for receiving the pawl of the lever 120 when the clutch is in and out, respectively.

Each of the levers 118, 119 and 120 has a longitudinally elongated slot 135, in which is slidably received a pin 136.

The lever 118 is pivoted, by means of a pin 136 in the slot 135 in said lever, to a link 137 which extends longitudinally through the tubular member 104. Connected with the forward end of the link 137 is a cable 138 which extends around guide pulleys 139 and 140, shown in Fig. 3, and is then secured to the rear end of the lever 79.

The pin 136 of the lever 119 is connected with a rod 141 which extends to the forward end of the tubular member 104. A cable 142 is connected with the rod 141, and is thence extended around guide pulleys 143 and 144, shown in Fig. 3, and is then secured to the rear end of the lever 72.

A strong coil spring 145 connects the levers 79 and 72 between their pivot points and the levers 74 and 78.

The pin 136 of the lever 120 is connected with the rod 146 extending forwardly in the tubular member 104. Secured to the forward end of the rod 146 is a cable 147, which extends around the guide pulley 143 and is then secured to the rear end of the clutch controlling lever 36.

The tongue 86 may be connected with the tongue of a wagon, or a machine, by extending the tongue of such other machine or wagon or the like through yokes 148 on the tongue 86, and extending through the tongues a suitable bolt.

In Fig. 10 I have shown a slightly modified form of connecting two such tongues together. The tongue 86, as shown in Fig. 10, is secured at its forward end by means of a bolt or pin 149ª to the tongue hitch. A tongue 150 is secured to the tongue hitch by a pin 150ª. A bolt 149 fastens the two portions of the tongue hitch together and allows pivotal movement. Fixed to the tongue hitch near its connected ends are U-shaped limiting devices 151 and 152, the arms of which project toward each other, as illustrated in Fig. 10. Connecting the limiting devices 152 at the right of the tongue is a spring 153, and connecting said devices at the left of the tongue is a similar spring 154. The springs normally tend to hold the tongues in alined substantially horizontal position.

When, however, owing to inequalities in the ground over which the machine travels or other causes, the tongues tend to buckle, the arms 155 of the limiting devices engage each other, when such tilting reaches a certain point, and limits such tilting.

For supporting the rearward end of the tractor when it is not used for hauling other machinery or conveyer, I have detachably connected with the tongue 86 a suitable fork 156. The fork 156 may be fastened to the tongue 86 by means of bolts 157 or the like which are readily removable. The fork 156 preferably comprises a frame, supporting a transversely arranged axle 158 on which are laterally spaced wheels 159.

In Fig. 12 I have shown a modified form of my invention in which the main frame has the spaced longitudinal members 160 connected by the spaced transverse members 161.

In the form of the device shown in Fig. 12, the engine 162 is mounted over the axle, with its shaft 163 extending rearwardly, and having at its rear end a clutch member 164 designed to coact with a slidably but non-rotatably mounted clutch member 165 on a shaft 166.

On the shaft 166 is a worm 167 for operating the shift gears.

Mounted in the frame 160 is a shaft 168 on which, on opposite sides of the engine 162, are large traction wheels 169. The shaft 170 is operated from the shift gears and is connected with the shaft 168 by means of sprockets 171, 172, 173 and 174, and chains 175 and 176.

The device shown in Fig. 12 is connected with a wagon or other piece of machinery in the same manner as the preferred form of my device, hereinbefore more fully described.

In the practical use of my improved tractor, where the tractor is not connected with another piece of machinery or vehicle, it is used with a fork such as that shown in Figs. 1 and 2.

When the tractor is desired for use with any other vehicle or piece of machinery such as a binder or the like, the fork is removed and the tongue 86 is connected with the tongue of the vehicle or machine in the manner illustrated in Fig. 6 or Fig 10.

The means for supporting the controlling levers and the steering wheel, extends rearwardly far enough so that they may be accessible from the seat of a wagon or binder or the like.

The tongue 150 may be of such length as to bring the driver's seat on the vehicle or other machine to position convenient for operating the steering wheel 97 and the controlling levers.

It will be seen that the tubular member 104 and the steering rod 96 may be readily raised from the rear ends thereof. When they are thus raised the members 98 will be forced forwardly against the tension of the spring 107 until the pins 106 and 103 slide into another notch.

In order to lower said members, the members 98 must be swung forwardly by hand, but said members may be raised and will be automatically supported in their new positions.

It will be noted that the tractor is steered by swinging the rear end laterally by means of the steering wheel and steering rod, the gears 93, and 94, the shaft 88, the gear 89 and the rack 81.

An adjustment of the width of the two-part wheel of the form of my invention illustrated in Figs. 1 and 2 may be readily had for varying the width of the traction wheel, and thereby varying the tread surface and the traction which can be secured.

This adjustment is had in the manner hereinbefore described by loosening the bars 26 and removing the bolts 25, and then shoving the wheel members 19 laterally on the axle 11.

Some changes may be made in the construction and arrangement of the various parts of my improved device without departing from the essential features and purposes of my invention, and it is my intention to cover by my claims any modified forms of structure or use of mechanical equivalents which may be reasonably included within their scope.

I claim as my invention:

1. In a device of the class described; a frame; an axle thereon; a wheel on said axle; an engine on said frame; means for imparting rotation to said wheel from said engine, including a variable speed gearing device and a clutch; a tongue pivoted to said frame; means supported on said tongue for controlling said variable speed gearing device, said means including a tubular member pivotally supported at its forward end; a plurality of levers mounted on said tubular member, cables operatively connected with said variable speed gearing device and extending through said tubular member and operatively connected with said levers.

2. In a device of the class described; a frame; an axle thereon; a wheel on said axle; an engine on said frame; means for imparting rotation to said wheel from said engine, including a variable speed gearing device and a clutch; a tongue pivoted to said frame; means supported on said tongue for controlling said variable speed gearing device, said means including a tubular member pivotally supported at its forward end; a plurality of levers mounted on said tubular member, cables operatively connected with said variable speed gearing device and extending through said tubular member and operatively connected with said levers; and means for adjustably supporting said tubular member in various positions of its vertical swinging movement.

3. In a device of the class described; a frame; an axle thereon; a wheel on said axle; an engine on said frame; means for imparting rotation to said wheel from said engine, including a variable speed gearing device and a clutch; a tongue pivoted to said frame; means supported on said tongue for controlling said variable speed gearing device, said means including a tubular member pivotally supported at its forward end; a plurality of levers mounted on said tubular member, cables operatively connected with said variable speed gearing device and extending through said tubular member and operatively connected with said levers; means for adjustably supporting said tubular member in various positions of its vertical swinging movement; said last means including a pivoted notched member; a pin projecting from said tubular member and adapted to coact with said notched member; and means for yieldingly holding said notched member in engagement with said pin.

4. In a device of the class described; a frame; an axle thereon; a wheel on said axle; an engine on said frame; means for imparting rotation to said wheel from said engine; a tongue pivoted to said frame; a curved rack bar on said frame; a shaft supported by said tongue, having a gear meshing with said rack bar; a second shaft supported on said tongue, and operatively connected with said first shaft; a steering rod connected with said last shaft by means of a universal joint; means for supporting said steering rod in a variety of vertically adjusted positions, said means including a pivoted notched member; a pin on said rod adapted to coact with said notched member; and means for yieldingly holding said notched member in engagement with said pin, said rod being capable of rotation with relation to said pin and said notched member.

5. In a device of the class described; a tractor having a tongue; a second tongue pivoted to said first tongue; U-shaped limiting devices on said tongue adjacent to each other, and having their arms forked toward each other in alinement; springs connecting said limiting devices at the sides of said tongue.

Des Moines, Iowa, April 23, 1919.

JOHN H. SISSEL.